(12) United States Patent
Blum et al.

(10) Patent No.: US 9,268,153 B2
(45) Date of Patent: Feb. 23, 2016

(54) DYNAMIC OPHTHALMIC LENS CAPABLE OF CORRECTING NIGHT AND DAY VISION

(71) Applicant: MITSUI CHEMICALS, INC., Tokyo (JP)

(72) Inventors: Ronald Blum, Roanoke, VA (US); William Kokonaski, Gig Harbor, WA (US)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 13/963,852

(22) Filed: Aug. 9, 2013

(65) Prior Publication Data

US 2014/0043584 A1 Feb. 13, 2014

Related U.S. Application Data

(60) Provisional application No. 61/681,811, filed on Aug. 10, 2012.

(51) Int. Cl.
 *G02C 7/06* (2006.01)
 *G02C 7/08* (2006.01)

(52) U.S. Cl.
 CPC ............... *G02C 7/083* (2013.01); *G02C 7/061* (2013.01); *G02C 7/086* (2013.01)

(58) Field of Classification Search
 CPC ......... G02C 7/083; G02C 7/086; G02C 7/088
 USPC .................. 351/159.03, 159.1, 159.39, 159.4
 See application file for complete search history.

(56) References Cited

U.S. PATENT DOCUMENTS

| 4,890,903 | A | 1/1990 | Treisman et al. |
| 5,182,585 | A | 1/1993 | Stoner |
| 5,229,885 | A | 7/1993 | Quaglia |
| 5,668,620 | A | 9/1997 | Kurtin et al. |
| 5,956,183 | A | 9/1999 | Epstein et al. |
| 5,999,328 | A | 12/1999 | Kurtin et al. |
| 6,040,947 | A | 3/2000 | Kurtin et al. |

(Continued)

FOREIGN PATENT DOCUMENTS

| WO | WO 2008/103906 A2 | 8/2008 |
| WO | WO 2012/166718 A1 | 12/2012 |

OTHER PUBLICATIONS

Pixeloptics, Inc., International Application No. PCT/US2013/054410, International Filing Date Aug. 9, 2013, International Search Report and Written Opinion, Dated Nov. 22, 2013, 21 pages.

*Primary Examiner* — Jordan Schwartz
(74) *Attorney, Agent, or Firm* — Sterne, Kessler, Goldstein & Fox PLLC

(57) ABSTRACT

Disclosed herein is a device that includes a host lens and a dynamic lens adapted to adjust its optical power based upon an input. The dynamic lens is in optical communication with the host lens. The device further comprises a photosensor, a controller electrically connected to the photosensor, and an actuator electrically connected to the controller. The actuator is also connected to the dynamic lens. The actuator provides an input interface to the dynamic lens, which is actuated based upon a signal received from the photosensor. The dynamic lens having a first zone of changeable optical power adapted to adjust its optical power within the range of −0.75 D to +0.75 D and an "optional" second zone of changeable optical power adapted to adjust its optical power within the range of +50 D to +1.25 D.

20 Claims, 7 Drawing Sheets

(56) References Cited

U.S. PATENT DOCUMENTS

| | | |
|---|---|---|
| 6,069,742 A | 5/2000 | Silver |
| 6,188,525 B1 | 2/2001 | Silver |
| 6,491,394 B1 | 12/2002 | Blum et al. |
| 6,517,203 B1 | 2/2003 | Blum et al. |
| 6,618,208 B1 | 9/2003 | Silver |
| 6,619,799 B1 | 9/2003 | Blum et al. |
| 6,893,124 B1 | 5/2005 | Kurtin |
| 7,008,054 B1 | 3/2006 | Kurtin et al. |
| 7,085,065 B2 | 8/2006 | Silver |
| 7,396,126 B2 | 7/2008 | Blum et al. |
| 7,604,349 B2 | 10/2009 | Blum et al. |
| 2003/0058406 A1* | 3/2003 | Blum et al. ............... 351/216 |
| 2004/0027501 A1* | 2/2004 | Blum et al. ............... 349/13 |
| 2012/0147316 A1 | 6/2012 | Loeb, Jr. et al. |
| 2012/0147317 A1 | 6/2012 | Loeb, Jr. et al. |
| 2014/0002791 A1* | 1/2014 | Sone et al. ............... 351/159.39 |
| 2014/0036226 A1* | 2/2014 | Blum et al. ............... 351/159.39 |

\* cited by examiner

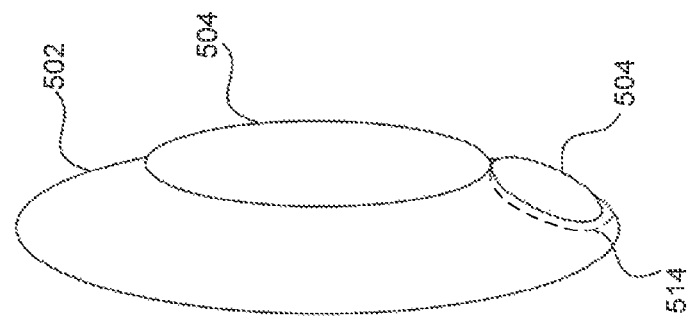
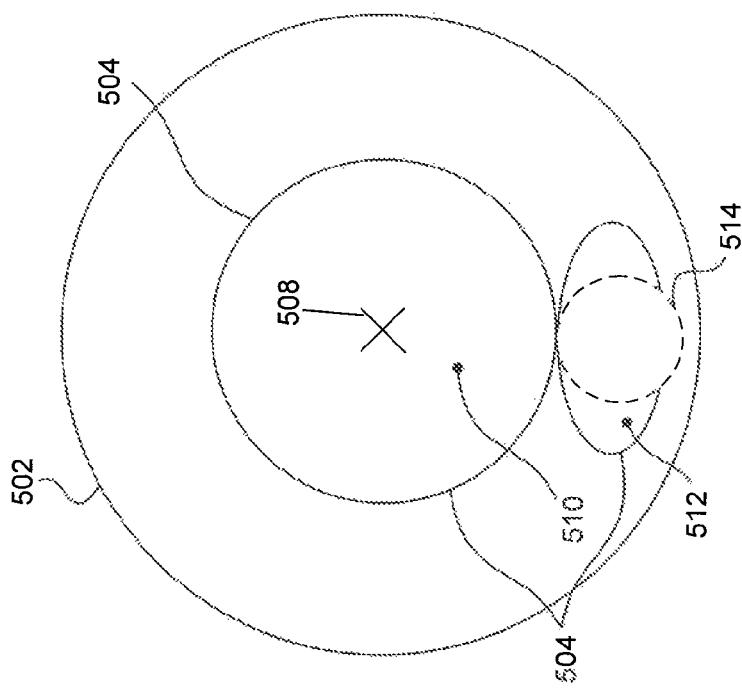

DYNAMIC OPHTHALMIC LENS CAPABLE OF CORRECTING NIGHT AND DAY VISION

CROSS-REFERENCE TO RELATED APPLICATIONS

This application claims priority from U.S. provisional patent application No. 61/681,811, filed on Aug. 10, 2012, which is incorporated herein by reference in its entirety.

TECHNICAL FIELD OF THE INVENTION

The present application generally relates to ophthalmic lenses. Specifically, the present invention provides ophthalmic lenses capable of correcting night vision and day vision manually or dynamically.

BACKGROUND OF THE INVENTION

It is well known that one of the major vision complaints of patients who see eye doctors (Optometrists, Ophthalmologists) for eye examinations is that their vision at night time is not as clear as they would like. In most cases the eye doctors examine the patient's eyes looking for disease, but with few exceptions the vast, vast majority of these patients have healthy eyes. The eye doctors prescribe for these patients the best optical correction possible to allow for the patients best corrected vision.

SUMMARY OF THE INVENTION

Disclosed herein are embodiments comprising ophthalmic lenses capable of correcting night vision and day vision, either dynamically or manually. Ophthalmic lenses according to embodiments of the invention may be mounted in a single pair of eyeglasses, thus remedying the problems described above in the conventional art.

In one embodiment, a device is provided. The device comprises a host lens that is adapted to fit into an eyeglass frame, a dynamic lens adapted to adjust its optical power based upon an input, the dynamic lens being in optical communication with the host lens. Further, the device comprises a sensor, a controller electrically connected to the sensor, an actuator electrically connected to the controller. The actuator is operably connected to the dynamic lens, and it is adapted to provide the input to the dynamic lens based upon a signal from the sensor. Further, the dynamic lens comprises a first zone adapted to alter its optical power by −0.75 D to +0.75 D of increased minus or increased plus optical power.

In one embodiment, the sensor is a photosensor.

In one embodiment, the dynamic lens comprises an electro-active lens.

In one embodiment, the first zone is in optical communication with a part of the host lens that provides the wearer's distance prescription.

In one embodiment, the first zone is in optical communication with the fitting point of the host lens.

In one embodiment, the dynamic lens comprises at least one of the group consisting of electronic lenses, electro-active lenses, fluid lenses, mechanical lenses, membrane lenses, and gas lenses.

In one embodiment, the first zone is adapted to alter its optical power within the range of 0.12 D to 0.75 D.

In one embodiment, the first zone is adapted to alter its optical power within the range of −0.50 D to +0.50 D.

In one embodiment, the first zone is adapted to alter its optical power by 0.75 Diopters.

In one embodiment, the first zone is adapted to alter its optical power by 0.50 Diopters.

In one embodiment, the dynamic lens is disposed on the host lens or within the host lens.

In one embodiment, the dynamic lens has only one zone.

In one embodiment, the host lens comprises a full power progressive addition surface.

In one embodiment, the dynamic lens further comprises a second zone.

In one embodiment, the second zone is adapted to increase optical power by +0.50 D to +2.50 D.

In one embodiment, the second zone overlaps a partial power progressive addition surface of the host lens.

In one embodiment, the second zone in combination with the host lens provides at least one of an intermediate optical power and of a near optical power.

In one embodiment, the second zone is an electro-active progressive power lens.

In one embodiment, the first zone or the second zone has a shape of one of the group consisting of a round, non-round shape, square, a rectangle, an oval, and a circle.

In one embodiment, the first zone or the second zone has a diameter ranging from 10 mm in diameter to 30 mm.

In one embodiment, the first zone or the second zone has a diameter ranging from 15 mm to 25 mm.

In one embodiment, the dynamic lens is configured to be adjusted manually, using a mechanism in one of the group consisting of a touch switch, a capacitor switch, a knob, and a manual switch.

In one embodiment, the sensor is adapted to detect daytime conditions and nighttime conditions, and based on the signal from the sensor, the actuator adjusts the optical power of the first zone to be at least 0.12 D to 0.75 D of less plus or more minus optical power in nighttime conditions than in daytime conditions depending upon the wearer's refractive needs.

In one embodiment, the actuator adjusts the optical power of the first zone to have a change of optical power within the range of −0.75 D to +0.75 D in nighttime conditions than in daytime conditions. In one embodiment, the actuator adjust the optical power of the first zone to be at least 0.12 D to 0.75 D more plus (less minus) in nighttime conditions than in day time conditions.

In one embodiment, the dynamic lens is, by way of example only, an electro-active lens, and in daytime conditions, the actuator deactivates the first zone.

In other embodiments the dynamic lens is one of a fluid lens, or mechanical lens and in daytime conditions, the actuator deactivates the first zone.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Embodiments of the invention will now be described, by way of example only, with reference to the accompanying schematic drawings in which corresponding reference symbols indicate corresponding parts. The accompanying drawings, which are incorporated herein and form part of the specification, illustrate the present invention and, together with the description, further serve to explain the principles of the invention and to enable a person skilled in the relevant art(s) to make and use the invention.

FIGS. 5A and 5B show a host lens incorporating a dynamic lens, according to an embodiment.

Figure 1:
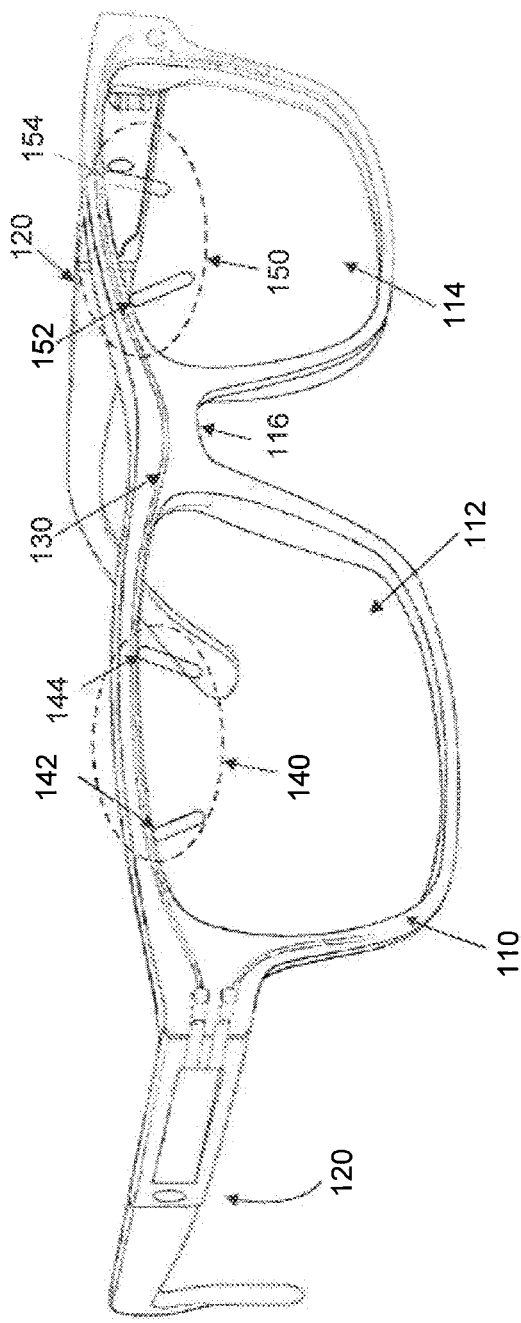
FIG. 1 illustrates a pair of eyeglass in which ophthalmic lenses are mounted, according to an embodiment.

The features and advantages of the present invention will become more apparent from the detailed description set forth below when taken in conjunction with the drawings, in which like reference characters identify corresponding elements throughout. Additionally, generally, the left-most digit(s) of a reference number identifies the drawing in which the reference number first appears.

DETAILED DESCRIPTION OF THE INVENTION

Before describing the various embodiments in detail, further explanation and definitions shall be provided regarding certain terms that are used throughout the descriptions below and generally used in the art(s) corresponding to the scope of the present disclosure.

Optical Power: The measure of the degree to which an optical system focuses light. Optical power is the inverse of the focal length, and it is typically expressed in units of Diopters (D). By way of example, 1 Diopter of optical power is the equivalent of the focusing power of an optics with a 1 meter focal length.

Lens: Any device or portion of a device that causes light to converge or diverge. The device can be static or dynamic. A lens can be refractive or diffractive. A lens can be either concave, convex or planar on one or both surfaces. A lens can be spherical, cylindrical, prismatic or a combination thereof. A lens can be made of optical glass, plastic or resin. A lens can also be referred to as an optical element, an optical zone, an optical region, an optical power region or an optic. It should be pointed out that within the optical industry a lens can be referred to as a lens even if it has zero optical power.

Ophthalmic Lens: A lens suitable for vision correction which includes a spectacle lens, a contact lens, an intra-ocular lens, a corneal in-lay, and a corneal on-lay.

Dynamic Lens: A lens with an optical power which is alterable with the application of electrical energy, mechanical energy or force. Either the entire lens can have an alterable optical power, or only a portion, region or zone of the lens can have an alterable optical power. The optical power of such a lens is dynamic or tunable such that the optical power can be switched between two or more optical powers. One of the optical powers can be that of substantially no optical power. Examples of dynamic lenses include electro-active lenses, meniscus lenses, fluid lenses, movable dynamic optics having one or more components, gas lenses, and membrane lenses having a member capable of being deformed. A dynamic lens can also be referred to as a dynamic optic, a dynamic optical element, a dynamic optical zone or a dynamic optical region.

Electro-Active Lens: An electro-active lens is a type of dynamic lens wherein the optical power is switched by applying a voltage to the lens. Liquid crystal can be placed in a cavity between two electrodes and the refractive index of a liquid crystal can be changed by generating an electric field across the liquid crystal. Such an electric field can be generated by applying one or more voltages to electrodes located on both sides of the liquid crystal whereby various optical powers can be created in the lens depending on the types of electrodes used, voltages applied to the electrodes and index of refraction altered within a thin layer of liquid crystal. The cavity shape can be refractive or diffractive.

Static Lens: A lens having an optical power which is not alterable with the application of electrical energy, mechanical energy or force. A static lens can also be referred to as a fixed lens. A static lens power can only be change by way of modifying an external surface of the static lens by way of surfacing and polishing the surface.

Bifocal Lens: A lens having two focal points or optical powers. Such lenses can be static or dynamic. Examples of dynamic bifocal lenses include electro-active lenses whereby two optical powers can be created in the lens depending on the types of electrodes used, voltages applied to the electrodes and index of refraction altered within a thin layer of liquid crystal. Bifocal lenses can also be a combination of a static with a dynamic lens. For example, an electro-active element can be used in optical communication with one of by way of example only, a static spherical lens, static single vision lens, static multifocal lens such as, by way of example only, a progressive addition lens.

Progressive Addition Lenses (PAL): corrective lenses used in eyeglasses to correct presbyopia and other disorders of accommodation. They are characterized by a gradient of increasing lens power, added to the wearer's correction for the other refractive errors. This continuous increasing lens power forms a channel of add power ranging from arrange of zero to 0.12 D diopters of add power at the start of the channel to that of 50% of the near power located in the intermediate zone to that of full add power which forms the near reading zone. The gradient starts at the wearer's distance prescription, at the fitting point of the lens (which is normally aligned at or near the wearer's pupil when looking straight ahead at far and horizontal to the ground) and reaches a maximum addition power, or the full reading addition below the midline of the lens. Usually, but not always approximately 14-22 mm below the fitting point. The length of the progressive power gradient on the lens surface depends on the design of the lens, with a final addition power between 0.75 and 3.50 Diopters. A progressive addition lens is comprised of a continuous surface that creates increasing plus optical power and has no discontinuities present on its progressive surface. This progressive addition surface can be located on either surface of the host lens or buried within the host lens. The addition value prescribed depends on the level of presbyopia of the patient. In general the older the patient, the higher the addition. For the purposes of this patent application it is important to note that a partial add power progressive is a progressive zone or region that does not solely comprise the full add power needs for the wearer. A full add power progressive provides the full add power needs for a wearer.

Host Lens: a host lens, for example, is a primary lens in a lens assembly or optical system which is relatively larger in size than all other lenses comprised in the assembly or system. By way of example only, in a two-lens optical system, wherein a first lens is disposed within or directly on top a second lens of relatively larger size, the second lens is considered to be host lens. The host lens periphery generally is what is affixed to that of an eyeglass frame.

Far Viewing Distance: The distance to which one looks, by way of example only, when viewing beyond the edge of one's desk, when driving a car, when looking at a distant mountain, or when watching a movie. This distance is usually, but not always, considered to be approximately 34 inches or greater from the eye. The far viewing distance can also be referred to as a far distance and a far distance point. Intermediate distance is usually, but not always, considered between 16 inches to 34 inches from the eye.

Near Viewing Distance: The distance to which one looks, by way of example only, when reading a book, when threading a needle, or when reading instructions on a pill bottle. This distance is usually, but not always, considered to be between approximately 12 inches and approximately 16 inches from the eye. The near viewing distance can also be referred to as a near distance and a near distance point.

Comprising: The term "comprising" herein corresponds to an open-ended limitation. For example, a device comprising features A, B, and C is a device that may, in addition to features A, B, and C have featured D, E, and F.

Consisting: The term "consisting" herein corresponds to a closed limitation. For example, a group consisting of A, B, C, and D is understood herein to mean that the group is made of elements A, B, C, and D only.

Add Power: The optical power added to the far distance viewing optical power which is required for clear near distance viewing in a multifocal lens. For example, if an individual has a far distance viewing prescription of −3.00 D with a +2.00 D add power for near distance viewing then the actual optical power in the near distance portion of the multifocal lens is −1.00 D. Add power is sometimes referred to as plus power. Add power can be further distinguished by referring to "near viewing distance add power" which refers to the add power in the near viewing distance portion of the lens and "intermediate viewing distance add power" which refers to the add power in the intermediate viewing distance portion of the lens. Typically, the intermediate viewing distance add power is approximately 50% of the near viewing distance add power. Thus, in the example above, the individual would have +1.00 D add power for intermediate distance viewing (as opposed to the +2.00 D) and the actual total optical power in the intermediate viewing distance portion of the multifocal lens is −2.00 D.

Fitting Cross/Fitting Point: A reference point on a PAL that represents the approximate location of the wearer's pupil when looking straight ahead through the lens once the lens is mounted in an eyeglass frame and positioned on the wearer's face. The fitting cross typically has a very slight amount of plus optical power ranging from just over +0.00 Diopters to approximately +0.12 Diopters. This point or cross is marked on the lens surface such that it can provide an easy reference point for measuring and/or double-checking the fitting of the lens relative to the pupil of the wearer. The mark is easily removed upon the dispensing of the lens to the patient/wearer. Further, the fitting point describes a position on the lens, regardless of whether a mark is present.

Optical Communication: The condition whereby two or more optics of given optical power are aligned in a manner such that light passing through the aligned optics experiences a combined optical power equal to the sum of the optical powers of the individual elements.

Progressive Addition Region or Surface: A region or surface of a lens having a first optical power in a first portion of the region and a second optical power in a second portion of the region wherein a continuous change in optical power exists therebetween. For example, a region of a lens can have a far viewing distance optical power at one end of the region. The optical power can continuously increase in plus power across the region, to an intermediate viewing distance optical power and then to a near viewing distance optical power at the opposite end of the region. After the optical power has reached a near-viewing distance optical power, the optical power can decrease in such a way that the optical power of this progressive addition region transitions back into the far viewing distance optical power. A progressive addition region can be on a surface of a lens or embedded within a lens. When a progressive addition region is on the surface and comprises a surface topography it is known as a progressive addition surface.

Further, when describing dynamic lenses, this disclosure contemplates, by way of example only, electro-active lenses, fluid lenses, gas lenses, membrane lenses, and mechanical movable lenses, etc. Examples of such lenses can be found in Blum et al. U.S. Pat. Nos. 6,517,203, 6,491,394 and 6,619,799, Epstein and Kurtin U.S. Pat. Nos. 7,008,054, 6,040,947, 5,668,620, 5,999,328, 5,956,183, 6,893,124, Silver U.S. Pat. Nos. 4,890,903, 6,069,742, 7,085,065, 6,188,525, 6,618,208, Stoner U.S. Pat. No. 5,182,585, and Quaglia U.S. Pat. No. 5,229,885.

During an eye exam, the refraction of the patient's eyes is often conducted in what is effectively a 20 foot dark room (or 10-15 feet with a mirror) while the patient is viewing a lighted screen with letters. In some cases the screen is back lit and in most cases the screen is a target whereby a projector is focusing an image of a known contrast and a known size.

The problem arises that the eye examination is not performed in a fully lighted environment for determining day time vision correction nor is it performed separately in a fully darkened or mostly darkened room with a night time target for determining the night time vision correction needed.

Historically most, if not all, eye doctors when prescribing the final optical correction prescription error on the side of prescribing more plus and less minus optical power. This is done so as to be as cautious as possible to not cause the patient to become more myopic/near sighted. However, it is believed that this proper caution of not over prescribing too much minus optical power (or too little plus optical power) whichever the case may be leaves the patient not fully corrected at night time when the pupil opens up and spherical aberration begins to influence the manner in which the patient sees at night.

Historically in many cases eye doctors will recommend to a patient who has a night time vision complaint anti-reflection coatings, and in a lesser number of cases the eye doctor will prescribe a second pair of eye glasses to help with night time vision. These eye glasses generally have between 0.25 D and 0.50 D of less plus or more minus optical power that the day time pair the patient wears. In most cases the patient will not purchase the second pair of eyeglasses due to the cost associated with having a second pair and also having to keep up with two pair of eyeglasses.

Thus there is a need for a corrective solution that allows a patient/wearer to see in an optimized manner during the daytime and also at night time with only one pair of eyeglasses.

The embodiments disclosed herein include a dynamic pair of eyeglasses, contact lenses, or intra-ocular lens that allows for seeing in an optimized manner during the day or at night. For one embodiment, a dynamic ophthalmic lens is capable of altering its optical power either manually or automatically based upon the available ambient light. It should be pointed out that such embodiments apply to any and all dynamic lenses capable of altering their optical power such as, by way of example only: fluid lenses, gas lenses, mechanical lenses, membrane lenses, electronic lenses, electro-active lenses.

Turning now to example embodiments of the invention, FIG. 1 illustrates a pair of eyeglasses wherein ophthalmic lenses according to an embodiment have been assembled. Eyeglasses 100 comprise frame front 110, right and left ophthalmic lenses 112 and 114, respectively, bridge 116 and temple 120. Electronic components are housed in temple 120. A flex cable 130 runs from temple 120 to frame front 110 and may provide electrical signals to ophthalmic lenses 112 and 114. To facilitate electrical connectivity to flex cable 130, lenses 112 and 114 have pairs of electrodes 140 and 150, respectively. For each pair of electrodes 140 or 150, individual electrodes 142, 144, 152, 154, may reside at different surface of the lens substrate, as will be described in detail below. While FIG. 1 illustrates a particular configuration for an eyeglass frame into which ophthalmic lenses 112 and 114 may be mounted, the configuration is not limiting. For example, in other embodiments, electronic components may be housed in different parts of eyeglass 100.

Figure 2A:
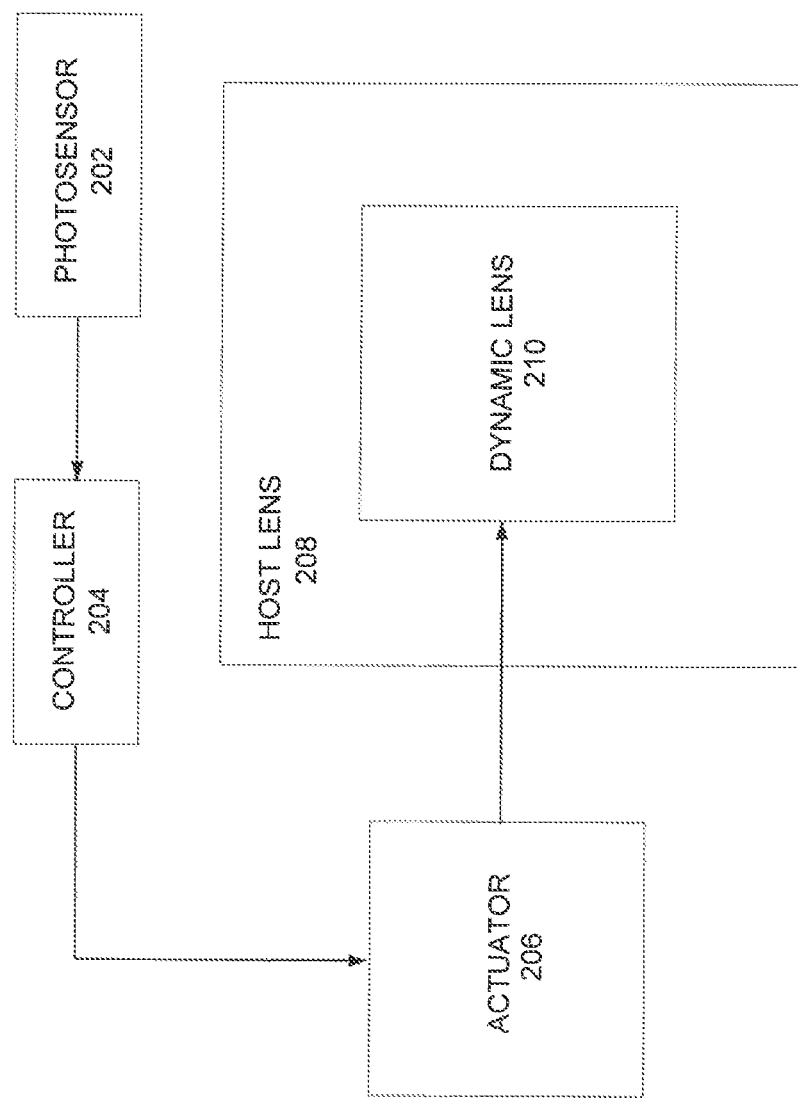
FIGS. 2A and 2B show a block diagram illustrating interconnections between various components of a device, according to an embodiment.

FIG. 2A depicts a block diagram that illustrates various interconnections between components of a device 200. The device 200 comprises a host lens 208 that is adapted to fit into an eyeglass frame (as shown in FIG. 1), a dynamic lens 210 adapted to adjust its optical power based upon an input, the dynamic lens 210 being in optical communication with the host lens 208. The dynamic lens 210 is disposed on the host lens 208 or within the host lens 208. Further, the device comprises a photosensor 202, a controller 204 electrically connected to the photosensor 202, an actuator 206 electrically connected to the controller 204. The actuator 206 is operably connected to the dynamic lens 210, and it is adapted to provide the input to the dynamic lens 210 based upon a signal from the photosensor 202. Further, the dynamic lens 210 comprises an electro-active lens which is a first zone (not shown) adapted to reduce its optical power by 0.12 D to 0.75 D. "Reduce" means increased minus optical power, decreased plus power, or a combination of the two. That is, the first zone is adapted to increase minus optical power by 0.12 D to 0.75 D of minus optical power. The first zone may be adapted to reduce plus optical power by 0.12 D to 0.75 D. Moreover, the first zone may be adapted to reduce plus optical power by 0.12 D to 0.75 D. However in certain embodiments of the invention the first zone may be adapted to "Increase" its optical power by 0.12 D to 0.75 D.

Furthermore, the first zone is in optical communication with the fitting point of the host lens 208. In other words, the first zone is in optical communication with a part of the host lens 208 that provides the wearer's distance prescription. Furthermore, it should be mentioned that the dynamic lens 210 may comprise at least one of the group consisting of electronic lenses, electro-active lenses, fluid lenses, mechanical lenses, membrane lenses, and gas lenses. Further, dynamic lens 210, in this embodiment, has only one zone. However, dynamic lens 210, in similar embodiments, may have a second zone in addition to the first zone.

In FIG. 2A, the photosensor 202 may be a photodiode or a phototransistor or any other device capable of converting light into electrical signals. The photosensor 202 may be an organic or an inorganic transducer, and it may be configured to operate in several well-known modes of operation. For example, the photosensor 202 may be configured to operate as a charge-coupled device (CCD) or as an active pixel sensor (APS). More generally, while the term "photosensor" refers to one or more electrical components adapted to sense the level of light, and to interact different with the controller depending on how much light is present. Photosensor 202 is configured to output an electrical signal to controller 204, which in turn, issues a command to actuator 206. Controller 204 may be, by way of example only, a microcontroller. The microcontroller may be programmed to linearly correlate input signal levels (i.e. the output signal from photosensor 202) with output signals of controller 204. Correlation between the input signal and the output signal of controller 204 may be achieved using a calibration curve stored in an internal memory of the controller 204, in the form of a look-up table. Further, the programming of controller 204 may be achieved prior to mounting the device shown in FIG. 2A into an eyeglass frame. Alternatively, or in addition, programming may be achieved wirelessly using a wireless link, such as for example, an infrared communication link or a radio frequency (RF) communication link. Output signals of controller 104 may then be used to drive actuator 206.

In some embodiments, the dynamic lens 210 may comprise at least one of the group consisting of electronic lenses, electro-active lenses, fluid lenses, mechanical lenses, membrane lenses, and gas lenses. As such, actuator 106 may also vary in architecture, depending on the type of lens which is to be actuated. By way of example only, in the present embodiment, actuator 206 is an electronic module that issues a voltage signal to drive an electro-active lens (not shown) comprised in dynamic lens 205. By way of example, when a zero-voltage signal is issued by actuator 206, the electro-active lens is deactivated, meaning that the dynamic lens provides negligible optical power (e.g. +0.00 D). When a non-zero voltage signal is issued, the electro-active lens is actuated, and its optical power may be changed from 0.12 D to 0.75 D, inclusive, preferably from 0.25 D to 0.5 D, inclusive.

Figure 2B:
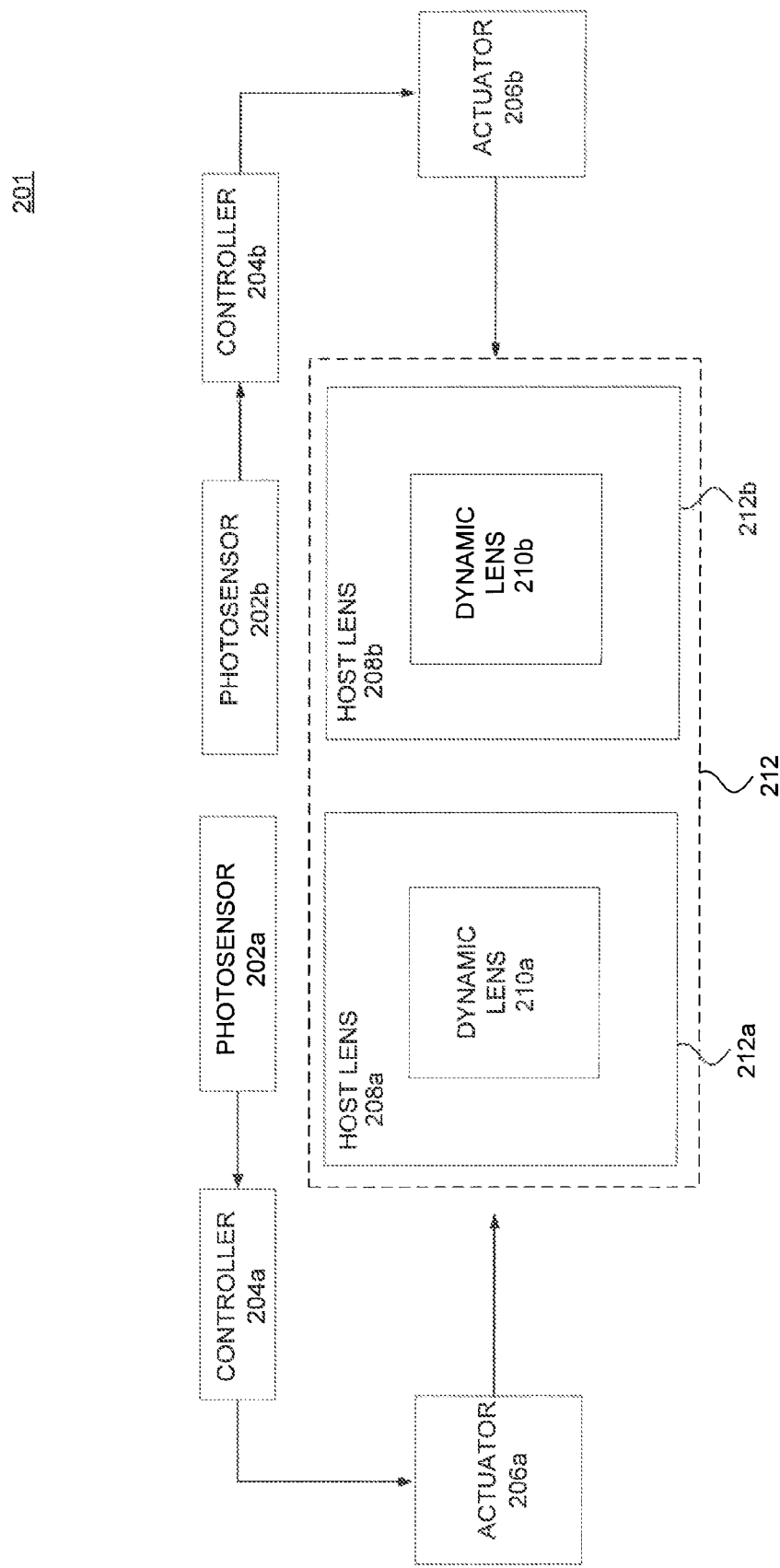

FIG. 2B shows device 201 according to another embodiment of the invention. The operation of the of device 201 is similar to the operation of device 200, except that device 201 comprises two lens assemblies (212a and 212, collectively 212), each comprising a host lens (208a and 208b) and a dynamic lens (210a and 210b). For example, the device of FIG. 2B may be an eyeglass wherein each lens assembly (212a and 212b) is an ophthalmic lens according to an embodiment of the invention. Further, while the device of FIG. 2B depicts for each lens assembly a dedicated photosensor (202a and 202b), controller (204a and 204b), and actuator module (206a and 206b) of the like of photosensor 202, controller 204, and actuator 206, of device 200, lens assemblies 212a and 212b may be operated utilizing a single photosensor 202, a single controller 204, and a single actuator 206.

Further, while controller 204a and controller 204b are programmed to issue the same command to each of dynamic lenses 210a and 210b, it may be necessary to program controller 204a and controller 204b with different calibration curves, in order to effect the same change in optical power in each of dynamic lens 210a and dynamic lens 210b. Such a situation may arise, for example, as result of mismatches in photosensor 202a and photosensor 202b.

Generally speaking, in the embodiments depicted in FIG. 2A and FIG. 2B, photosensor 202, 202a, and 202b are adapted to detect day time conditions and night time conditions, and based on the signal from photosensor 202, 202a, 202b, actuators 206, 206a, and 206b adjust the optical power of the dynamic lens 210, 210a, and 210b to be at least 0.12 D to 0.75 D less than in daytime conditions. More preferably, the actuators 206, 206a, and 206b adjust the optical power of the dynamic lens 210, 210a, 210b to be at least 0.25 D to 0.50 D less than the optical power in daytime conditions. Furthermore, in daytime conditions, the actuators 206, 206a, and 206b deactivate the dynamic lenses 210, 210a, 210b, i.e. actuator 206, 206a, and 206b cause the dynamic lens to have negligible (e.g. +0.00 D) optical power.

While FIG. 1, FIG. 2A, and FIG. 2B provided a system overview of several embodiments of the invention, FIGS. 3-6 depict ophthalmic lenses, according to embodiments of the invention. These four embodiments of the invention, i.e. FIGS. 3-6, are discussed below.

In a first embodiment (see FIG. 3A and FIG. 3B) an ophthalmic lens is that of a lens correcting a wearer's distance vision (the host lens) comprises a dynamic electro-active optic or lens. In this embodiment the dynamic electro-active lens comprises a zone of changeable optical power within the range of −0.75 D to +0.75 D which is located directly in front of the pupils of the eyes of the wearer when looking at a distance object at eye level. In one embodiment, the zone has optical power within the range of −0.12 to −0.75 D. The electro-active lens is in optical communication with the host lens that corrects the wearer's distance vision. In most, but not all cases, the electro-active lens is located on or within the host lens. In certain other embodiments the electro-active lens is a separate lens that is in optical communication with that of the host lens correcting the wearer's distance vision. The preferred optical power range is between that of −0.50 D and +0.50 D. In one embodiment, the preferred optical range is between that of a negative 0.25 D and −0.50 D. The size of the zone ranges from 10 mm in diameter to that of 30 mm in diameter, with a preferred zone size range of 15 mm to 25 mm in diameter. The zone can be any shape such, as by way of example, a non-round, square, rectangle, oval, or circle. The most preferred shapes are that of a horizontal oval or a circle.

It should be pointed out that in the first embodiment when the electro-active optic or lens is activated the ophthalmic lens (the host lens and the electro-active optic or lens) creates a bifocal lens. However, unlike normal bifocals, this bifocal lens does not correct for intermediate or near vision, but rather having a zone in front of the wearer's pupils that increases the wearer's ability to see more clearly at night or in a darkened ambient light. This lens can then be changed back dynamically to allow for the eye doctor preferred vision correction for the wearer in day time ambient light by eliminating the electro-active additional minus optical power.

Figure 3B:
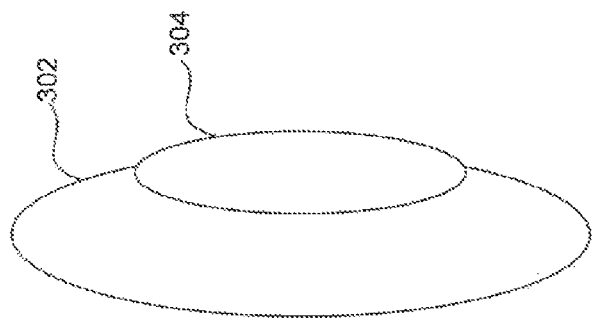
FIGS. 3A and 3B illustrate a host lens incorporating a dynamic lens, according to an embodiment.
Figure 3A:
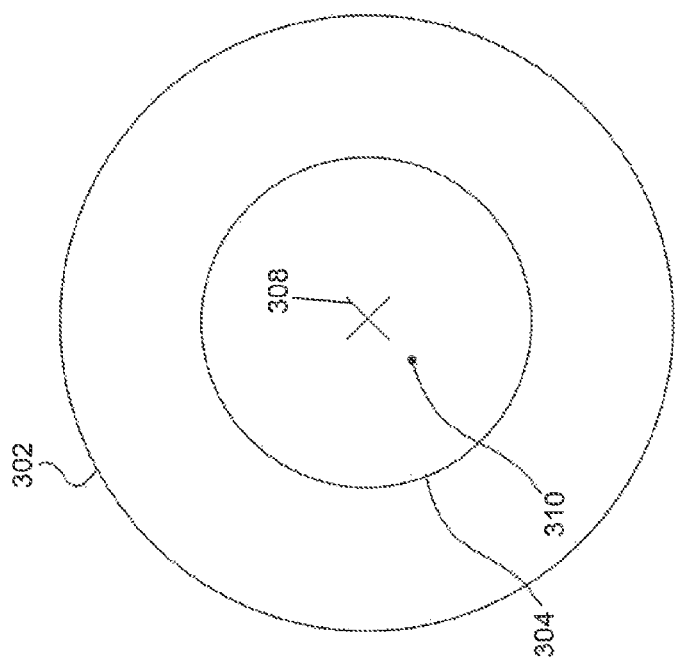

FIG. 3A shows a host lens 302 and a dynamic lens, both forming an ophthalmic lens, according to an embodiment of the invention. FIG. 3B is a side view of the example embodiment depicted in FIG. 3A, but showing only host lens 302 and dynamic lens 304.

Host lens 302 is configured to correct a wearer's distance vision, i.e. the wearer's ability to distinguish an object located at a far viewing distance. In this embodiment, the dynamic lens comprises an electro-active lens 304. Electro-active lens 304 includes a zone 310 of changeable optical power within the range of −0.75 D to +0.75 D that is located directly in front of the pupils of the eyes of the wearer when looking at a distance object at eye level, i.e. the zone 310 is concentric with fitting cross 308. In one embodiment, electro-active lens 304 includes a zone 310 of changeable optical power within the range −0.12 D to −0.75 D. In some embodiments, the electro-active lens is located on the host lens or within the host lens. In other embodiments, the electro-active lens 304 may be a separate lens that is in optical communication with the host lens 302.

Preferably, the optical power range of the zone 310 is between that of −0.50 D and +0.50 D. In one embodiment, the optical power range of the zone 310 is between that of −0.25 D and −0.5 D. Preferably, the size of the zone ranges from 10 mm in diameter to that of 30 mm in diameter, with a preferred zone size range of 15 mm to 25 mm in diameter. While FIG. 3 depicts electro-active lens 304 and the zone 310 as circular, electro-active lens 304 and zone 310 can be of any shape such as, by way of example, a square, rectangle, oval, or circle. Preferably, however, shapes that are of an oval with the longer axis of symmetry disposed horizontally or of a circle are contemplated.

In the embodiment depicted in FIG. 3, when electro-active lens 304 is activated, the ophthalmic lens (i.e. host lens 302 and electro-active lens 304) creates a bifocal lens. However, unlike conventional bifocals, this embodiment does not correct for intermediate or near vision, but rather, having zone 310 in front of the wearer's pupils, it increases the wearer's ability to see more clearly at night or in a darkened ambient light. This embodiment of the invention can then be changed back dynamically to allow for the eye care practitioner's preferred vision correction for the wearer in day time ambient light by deactivating electro-active lens 304, that is, by eliminating the electro-active additional minus optical power. "Deactivating" an electro-active lens herein means providing an actuation voltage which causes the electro-active lens to exhibit negligible optical power (e.g. +0.00 D). By way of example, such an actuation voltage could be 0V. Still by way of example, when a non-zero voltage signal is provided to the electro-active lens, the lens is said to be activated. The term "activating" means herein that the electro-active lens has a non-zero optical power and that the optical power of the electro-active lens can be tuned within a pre-determined optical power range. For example, activating electro-active lens 304 means providing, by way of example, a non-zero voltage signal which causes the optical power of electro-active lens 304 to be non-zero. Further, varying the non-zero signal to values other than 0V causes the optical power of electro-active lens 304 to be changed from 0.12 D to 0.75 D, inclusive, and preferably from 0.25 D to 0.5 D, inclusive.

In a second embodiment (see FIG. 4A and FIG. 4B) an ophthalmic lens is that of a lens correcting a wearer's distance vision and intermediate vision (the host lens) comprises a dynamic electro-active optic or lens. In this embodiment the dynamic electro-active lens comprises a zone of changeable optical power within the range of −0.75 D to +0.75 D which is located directly in front of the pupils of the eyes of the wearer when looking at a distance object at eye level. In one embodiment, the dynamic electro-active lens comprises a zone of optical power within the range of −0.12 D to −0.75 D. The electro-active lens is in optical communication with the area of the host lens that corrects the wearer's distance vision. In most, but not all cases, the electro-active lens is located on or within the host lens. In certain other embodiments the electro-active lens is a separate lens that is in optical communication with that of the host lens correcting the wearer's distance vision. The preferred optical power range is between that of −0.50 D and +0.50 D. In one embodiment, the preferred optical power range is between that of negative 0.25 D and −0.50 D. The size of the zone ranges from 10 mm in diameter to that of 30 mm in diameter, with a preferred zone size range of 15 mm to 25 mm in diameter. The zone can be any shape such, as by way of example, a square, rectangle, oval, or round area. The most preferred shapes are that of a horizontal oval or a round area.

It should be pointed out that in the second embodiment when the electro-active optic or lens is activated the ophthalmic lens (the host lens and the electro-active optic or lens) allows for improving the wearer's vision correction at night or during darkened ambient light. In the second embodiment the host lens can be, by way of example, only a progressive addition lens. When the host lens is that of a progressive addition lens the progressive addition surface contributing the full add power for the wearer it can be formed by way of free forming the back surface of the host lens or can be formed on the front surface of the host lens. This lens can then be changed back dynamically to allow for the eye doctor preferred day time vision correction for the wearer by eliminating the electro-active minus optical power.

Figure 4B:
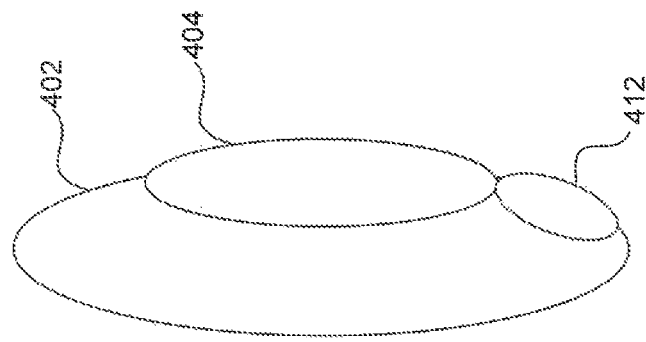
FIGS. 4A and 4B depicts a host lens incorporating a dynamic lens, according to an embodiment.
Figure 4A:
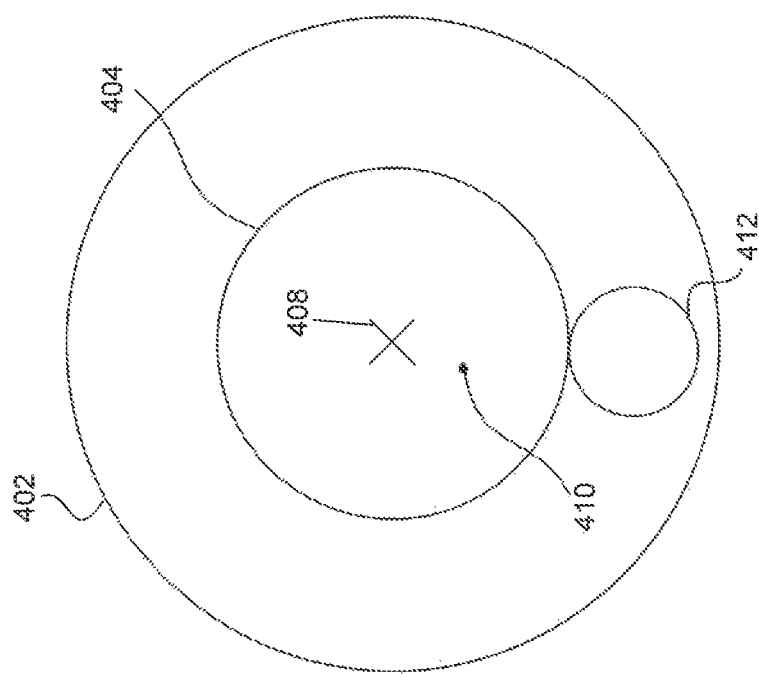

FIG. 4A shows a host lens 402 and a dynamic lens 404, both forming an ophthalmic lens, according to an embodiment of the invention. FIG. 4B is a simplified side view of the example embodiment depicted in FIG. 4A.

Host lens 402 is configured to correct a wearer's distance vision. In this embodiment, the dynamic lens comprises an electro-active lens 404. Electro-active lens 404 includes a zone 410 of changeable optical power within the range of −0.75 D to +0.75 D. In one embodiment, zone 410 has a changeable optical power within the range of −0.12 D to −0.75 D, and zone 410 is located directly in front of the pupils of the eyes of the wearer when looking at a the distance object at eye level, i.e. zone 410 is concentric with fitting cross 408. In some embodiments, electro-active lens 404 is located on the host lens 402 or within the host lens 402. In other embodiments, the electro-active lens 404 may be a separate lens that is in optical communication with the host lens 402.

Preferably, the optical power range of zone 410 is between −0.50 D and +0.50 D. In one embodiment, the optical power range of zone 410 is between −0.25 D and −0.50 D. Preferably, the size of zone 410 ranges from 10 mm in diameter to that of 30 mm in diameter, with a preferred zone size range of 15 mm to 25 mm in diameter. While FIG. 2 depicts electro-active lens 404 and zone 410 as circular, electro-active lens 404 and zone 410 can be any shape such, as by way of example, a non-round, square, rectangle, oval, or circle. Preferably, however, shapes that are of an oval with the longer axis of symmetry disposed horizontally or of a circle are contemplated.

In FIG. 4A and FIG. 4B the host lens 402 is, by way of example, only a progressive addition lens. In this configuration, host lens 402 provides a progressive addition surface 412 contributing the full add power for the wearer. The progressive addition surface 412 may be formed by way of free forming the back surface of the host lens 402 or can be formed on the front surface of the host lens 402.

In a third embodiment (see FIG. 5A and FIG. 5B) an ophthalmic lens is that of a lens correcting a wearer's distance vision and intermediate vision (the host lens) comprises a dynamic electro-active optic or lens. In this embodiment the dynamic electro-active lens comprises two zones of switchable or changeable optical power.

The first zone is within the optical power range of −0.75 D to +0.75 D which is located directly in front of the pupils of the eyes of the wearer when looking at a distance object at eye level. In one embodiment, the first zone is within the optical power range of −0.12 D to −0.75 D. The electro-active lens is in optical communication with the area of the host lens that corrects the wearer's distance vision. In most, but not all cases, the electro-active lens is located on or within the host lens. In certain other embodiments the electro-active lens is a separate lens that is in optical communication with that of the host lens correcting the wearer's distance vision. The preferred optical power range is between that of a negative −0.50 D and +0.50 D. In one embodiment, the preferred optical power range is negative 0.25 to −0.5 D. The size of the zone ranges from 10 mm in diameter to that of 30 mm in diameter, with a preferred zone size range of 15 mm to 25 mm in diameter. The zone can be any shape such, as by way of example, a non-round, square, rectangle, oval, or round area. The most preferred shapes are that of a horizontal oval or a round area.

The second zone is of a plus or positive changeable optical power within the range of +0.50 to +2.50 D of add power that is less than what is required for the wearer to see clearly a near object being 14 inches to 18 inches from the eyes of the wearer. The second zone is located below the lower edge of the wearer's pupils when looking at a distant object at eye level. The electro-active lens is in optical communication with the area of the host lens that corrects the wearer's distance vision, intermediate and near vision. In most, but not all cases, the electro-active lens is located on or within the host lens. In certain other embodiments the electro-active lens is a separate lens that is in optical communication with that of the host lens. The preferred changeable optical power range of the second zone is between that of +0.50 and +1.25 D. The size of the zone ranges from 20 mm in diameter to that of 35 mm in diameter, with a preferred zone size range of 20 mm to 30 mm in diameter. The zone can be any shape such, as by way of example, a non-round, square, rectangle, oval, or round area. The most preferred shapes are that of a horizontal oval or a round area.

It should be pointed out that in the third embodiment when the electro-active optic or lens first zone is activated the ophthalmic lens (the host lens and the electro-active optic or lens) allows for improving the wearer's vision correction at night or during darkened ambient light. In the third embodiment the host lens can be, by way of example only, a "partial" add power progressive addition lens whereby the "full" near add power is provided by the electro-active optic or lens second zone when activated. The partial add power progressive not contributing the wearer's required total add power can be formed on the front surface of the host lens or free formed on the back surface of the host lens. This lens can then be changed back dynamically to allow for the eye doctor preferred day time vision correction for the wearer by eliminating the electro-active minus optical power of the first zone.

FIG. 5A shows a host lens 502 and a dynamic lens 504, both forming an ophthalmic lens, according to an embodiment of the invention. FIG. 5B is a side view of the example embodiment depicted in FIG. 5A. In this embodiment, the dynamic lens comprises an electro-active lens 504. The electro-active lens comprises two zones of switchable or changeable optical power, i.e. a first zone 510 and a second zone 512.

The first zone 510 has optical power within the changeable optical power range of −0.75 D to +0.75 D. In one embodiment, first zone 510 has a changeable optical power in the range −0.12 to −0.75 D, and it is disposed directly in front of the pupils of the eyes of the wearer when looking at a distance object at eye level, i.e. zone 510 is concentric with fitting cross 408. The electro-active lens 404 is in optical communication with the area of the host lens 402 that corrects the wearer's distance vision.

In some embodiments, the electro-active lens 504 is disposed on or within the host lens 502. In some embodiments, however, the electro-active lens 504 may be a separate lens that is in optical communication with the host lens 502. The preferred optical power range of the first zone 510 is between that of a −0.50 D and +0.50 D. In one embodiment, the range of the first zone 510 is between that of −0.25 D and −0.5 D. The size of the first zone 510 ranges from 10 mm in diameter to that of 30 mm in diameter, with a preferred zone size ranging from 15 mm to 25 mm in diameter. The first zone 510 can be any shape such as, by way of example, a non-round, square, rectangle, oval, or round area. Preferably, however, shapes that are of an oval with the longer axis of symmetry disposed horizontally or of a circle are contemplated.

In FIGS. 5A and 5B, the second zone 512 is of a plus or positive optical power. The second zone 512 has changeable optical power within the range of +0.50 to +2.50 D of add power, which is less than what is required for the wearer to clearly see a near object (i.e. 14 inches to 18 inches from the eyes). The second zone 512 is disposed below the lower edge of the wearer's pupils when looking at a distant object at eye level, i.e. below fitting cross 508.

Further, in this embodiment, the electro-active lens 504 is in optical communication with the area of the host lens 502 that corrects the wearer's distance vision, intermediate and near vision. In some embodiments, the electro-active lens 404 is located on or within the host lens 502. In some embodiments, however, the electro-active lens 404 is a separate lens that is in optical communication with that of the host lens 502.

The preferred optical power range of the second zone 512 is between +0.50 D and +1.25 D. The size of the second zone 512 ranges from 20 mm in diameter to that of 35 mm in diameter, with a preferred zone size range of 20 mm to 30 mm in diameter. The second zone 512 can be any shape such, as by way of example, a non-round, square, rectangle, oval, or round area. The most preferred shapes are that of a horizontal oval or a round area. Preferably, however, shapes that are of an oval with the longer axis of symmetry disposed horizontally or of a circle are contemplated.

Further, in FIG. 5A and FIG. 5B, the host lens can be, by way of example only, a "partial" add power progressive addition lens. In such a case, the "full" near add power is provided by the second zone 512 of the electro-active lens 404, when the second zone 512 is activated. The partial add power progressive (surface 514) not contributing the wearer's required total add power can be formed on the front surface of the host lens or free formed on the back surface of the host lens. In other words, second zone 512 overlaps a partial addition power progressive surface 514 of the host lens 502. Electro-active lens 504 can then be changed back dynamically to allow for the eye doctor's preferred day time vision correction for the wearer by eliminating the electro-active minus optical power of the first zone 510.

In a fourth embodiment (see FIG. 6A and FIG. 6B) an ophthalmic lens is that of a lens correcting a wearer's distance vision and intermediate vision (the host lens) comprises a dynamic electro-active optic or lens. In this embodiment the dynamic electro-active lens comprises two zones of switchable or changeable optical power.

The first zone is within the changeable optical power range of −0.75 D to +0.75 D which is located directly in front of the pupils of the eyes of the wearer when looking at a distance object at eye level. In one embodiment, the first zone is within the optical power range of −0.12 D to −0.75 D. The electro-active lens is in optical communication with the area of the host lens that corrects the wearer's distance vision. In most, but not all cases, the electro-active lens is located on or within the host lens. In certain other embodiments the electro-active lens is a separate lens that is in optical communication with that of the host lens correcting the wearer's distance vision. The preferred optical power range is between that of a −0.50 D to +0.50 D. In one embodiment, the preferred optical power range is between negative 0.25 D and −0.50 D. The size of the zone ranges from 10 mm in diameter to that of 30 mm in diameter, with a preferred zone size range of 15 mm to 25 mm in diameter. The zone can be any shape such, as by way of example, a non-round, square, rectangle, oval, or round area. The most preferred shapes are that of a horizontal oval or a round area.

The second zone is of a changeable plus or positive optical power of +0.50 to +2.50 D which is located below the lower edge of the wearer's pupils when looking at a distant object at eye level. The electro-active lens is in optical communication with the area of the host lens that corrects the wearer's distance vision, intermediate and near vision. In most, but not all cases, the electro-active lens is located on or within the host lens. In certain other embodiments the electro-active lens is a separate lens that is in optical communication with that of the host lens. The preferred optical power range is between that of +0.50 D and +1.25 D. The size of the zone ranges from 20 mm in diameter to that of 35 mm in diameter, with a preferred zone size range of 20 mm to 30 mm in diameter. The zone can be any shape such, as by way of example, a non-round, square, rectangle, oval, or round area. The most preferred shapes are that of a horizontal oval or a round area.

It should be pointed out that in the fourth embodiment when the electro-active optic or lens first zone is activated the ophthalmic lens (the host lens and the electro-active optic or lens) allows for improving the wearer's vision correction at night or during darkened ambient light. In the fourth embodiment the host lens can be, by way of example only, a single vision lens whereby the full near add power and the full intermediate add power required for the wearer is provided by the electro-active optic or lens second zone. In this case, the electro-active optic or lens second zone provides two optical add powers; one of the required intermediate power and one of the near optical power or the electro-active optic or lens second zone is that of an electro-active progressive power region which provides the required intermediate power and near power correction for the wearer.

Figure 6B:
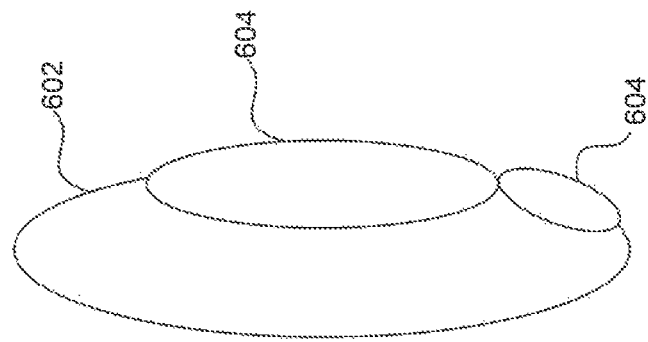
FIGS. 6A and 6B show a host lens incorporating dynamic lens, according to an embodiment.
Figure 6A:
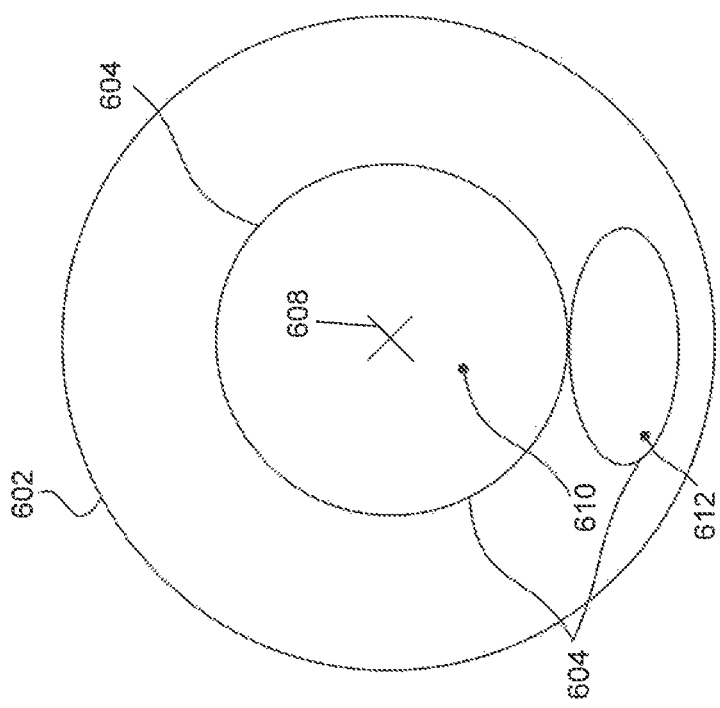

FIG. 6A shows a host lens and a dynamic lens, both forming an ophthalmic lens, according to an embodiment of the invention. FIG. 5B is a side view of the example embodiment depicted in FIG. 6A.

FIG. 6A depicts an ophthalmic lens adapted to correct a wearer's distance vision and intermediate vision. The ophthalmic lens comprises a host lens 602 and a dynamic lens, the dynamic lens comprising an electro-active lens 604. The electro-active lens in this embodiment comprises two zones of switchable or changeable optical power, a first zone 610 and a second zone 612.

The first zone 610 has changeable optical power within the range of −0.75 D to +0.75 D and it is located directly in front of the pupils of the eyes of the wearer when looking at a distance object at eye level, i.e. it disposed concentric with fitting cross 608. The electro-active lens 604 is in optical communication with the area of the host lens 602 that corrects the wearer's distance vision. In one embodiment, first zone 610 has changeable optical power in the range −0.12 D to −0.75 D.

In some embodiments, the electro-active lens 604 is located on or within the host lens 602. In some embodiments, however, the electro-active lens 604 is a separate lens that is in optical communication with that of the host lens 602.

The preferred optical power range of the first zone 610 is between that of −0.50 D and +0.50 D. In one embodiment, first zone 610 has optical power within the range of −0.25 and −0.50 D. The size of the first zone 610 ranges from 10 mm in diameter to that of 30 mm in diameter, with a preferred zone size range of 15 mm to 25 mm in diameter. The first zone 610 can be any shape such, as by way of example, a non-round, square, rectangle, oval, or round area. Preferably, however, shapes that are of an oval with the longer axis of symmetry disposed horizontally or of a circle are contemplated.

The second zone 612 is of a plus or positive changeable optical power of +0.50 to +2.50 D and preferably +0.50 to +1.25 D. It is disposed below the lower edge of the wearer's pupils when looking at a distant object at eye level, i.e. below fitting cross 608. The electro-active lens 504 is in optical communication with the area of the host lens 602 that corrects the wearer's distance vision, intermediate and near vision (i.e. the ability to see object placed a near or intermediate viewing distance). The size of the second zone 612 ranges from 20 mm in diameter to that of 35 mm in diameter, with a preferred zone size range of 20 mm to 30 mm in diameter. The second zone 612 can be any shape such, as by way of example, a non-round, square, rectangle, oval, or round area. The most preferred shapes are that of a horizontal oval or a round area.

In the embodiment depicted in FIGS. 6A and 6B when the electro-active optic or lens first zone 610 is activated, the ophthalmic lens (i.e. host lens 602 and electro-active lens 604) allows for improving the wearer's vision correction at night or during darkened ambient light. Further, in this embodiment, by way of example only, a single vision lens may be used, wherein the full near add power and the full intermediate add power required for the wearer is provided by the electro-active lens' second zone 612. In this case, the electro-active lens second zone 610 provides two optical add powers; one of the required intermediate power and one of the near optical power. Alternatively, in some embodiments the electro-active lens second zone 612 is that of an electro-active progressive power region that provides the required intermediate power and near power correction for the wearer.

It should be further pointed out that in each of the above four embodiments the electro-active zone can be that of any dynamic optical zone of: fluid lenses, gas lenses, mechanical lenses, membrane lenses. This lens can then be changed back dynamically to allow for the eye doctor preferred day time vision correction for the wearer by eliminating the electro-active minus optical power of the first zone. In a fifth embodiment (not illustrated) is that of a dynamic lens and the lens itself is altered to allow for optimized vision during daytime or night time. In this case the fifth embodiment is altered or adjusted within the optical power range of −0.75 D to +0.75 D, or more preferably between −0.50 D and +0.50 D, for night time or darkened ambient light vision. And then it is altered back dynamically to its day time eye doctor preferred correction for the wearer by removing this additional minus or less plus optical power that was added for night time vision correction. In one embodiment, the optical power range is −0.12 D to −0.75 D, or more preferably between negative 0.25 D and −0.5 D.

In each of the embodiments disclosed herein a sensor, by way of example only, that of a photo-detector, by way of example only a photo diode, transistor or other low power small form factor detector place in either the frame or the lenses, can be used to sense darkened ambient light and thus to automatically by way of a controller and actuator alter the optical power to that of the preferred night time or darkened ambient light correction for the wearer. Also in each of the embodiments disclosed herein the dynamic lens is capable of being adjusted manually by way of one of: a touch switch, capacitor switch, a knob, a manual switch. The electro-active lens as disclosed can comprise that of a surface relief diffractive optic, pixilated refractive optic, or a pixilated diffractive optic.

Further, it should be mentioned that in each of the example embodiments discussed above, the dynamic lens may be changed back dynamically to allow for the eye doctor preferred day time vision correction for the wearer by eliminating the electro-active minus optical power of the first zone. In other embodiments, the first zone of the dynamic lens may provide zero power under nighttime conditions, and within the range of −0.75 D to +0.75 D power in daytime conditions. In this embodiment, the host lens has the wearer's nighttime distance prescription. But, it is preferable that the host lens have the wearer's daytime distance prescription and that the first zone provide negative power, so that the device is "failsafe" in daytime conditions. In the event of a power failure, it is preferable that the wearer's daytime distance prescription is available. In one embodiment, the dynamic lens provides zero power under nighttime conditions, and +0.12 D to +0.75 D in daytime conditions.

While testing patients, the inventors found that some patients needed more power at night than during the day for their distance prescription. That finding is contrary to conventional understanding. That finding has led to some of the embodiments described herein. However, most patients need less power at night.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. The breadth and scope of the invention should not be limited by any of the above-described exemplary embodiments, but should be defined only in accordance with the following claims and their equivalents.

What is claimed is:

1. A device, comprising:
    a host lens adapted to fit into an eyeglass frame and comprising a partial power progressive addition surface;
    a dynamic lens adapted to adjust its optical power based upon an input, the dynamic lens being in optical communication with the host lens;
    a sensor;
    a controller electrically connected to the sensor; and
    an actuator electrically connected to the controller, wherein the actuator is operably connected to the dynamic lens;
        wherein the actuator is adapted to provide the input to the dynamic lens based upon a signal from the sensor; and
        wherein the dynamic lens comprises:
            a first zone adapted to alter its optical power by −0.75 D to +0.75 D of increased minus or increased plus optical power; and a second zone adapted to increase its optical power by +0.50 D to +2.50 D, wherein the second zone overlaps the partial power progressive addition surface of the host lens.

2. The device of claim 1, wherein the dynamic lens comprises an electro-active lens.

3. The device of claim 1, wherein the first zone is in optical communication with a part of the host lens that provides the wearer's distance prescription.

4. The device of claim 1, wherein the first zone is in optical communication with the fitting point of the host lens.

5. The device of claim 1, wherein the dynamic lens comprises at least one of the group consisting of electronic lenses, electro-active lenses, fluid lenses, mechanical lenses, membrane lenses, and gas lenses.

6. The device of claim 1, wherein the first zone is adapted to alter its optical power within the range of 0.12 D to 0.75 D.

7. The device of claim 1, wherein the first zone is adapted to alter its optical power within the range of −0.50 D to +0.50 D.

8. The device of claim 1, wherein the first zone is adapted to alter its optical power by 0.75 Diopters.

9. The device of claim 1, wherein the first zone is adapted to alter its optical power by 0.50 Diopters.

10. The device of claim 1, wherein the dynamic lens is disposed on the host lens or within the host lens.

11. The device of claim 1, wherein the second zone in combination with the host lens provides at least one of an intermediate optical power and of a near optical power.

12. A device, comprising:
a host lens adapted to fit into an eyeglass frame;
a dynamic lens adapted to adjust its optical power based upon an input, the dynamic lens being in optical communication with the host lens;
a sensor;
a controller electrically connected to the sensor; and
an actuator electrically connected to the controller, wherein the actuator is operably connected to the dynamic lens;
wherein the actuator is adapted to provide the input to the dynamic lens based upon a signal from the sensor; and
wherein the dynamic lens comprises:
a first zone adapted to alter its optical power by −0.75 D to +0.75 D of increased minus or increased plus optical power; and
a second zone, wherein the second zone is an electro-active progressive power region.

13. The device of claim 1, wherein the first zone or the second zone has a shape of one of the group consisting of a square, a rectangle, an oval, and a circle.

14. The device of claim 1, wherein the first zone or the second zone has a diameter ranging from 10 mm in diameter to 30 mm.

15. The device of claim 14, wherein the first zone or the second zone has a diameter ranging from 15 mm to 25 mm.

16. The device of claim 1, wherein the dynamic lens is configured to be adjusted manually, using a mechanism in one of the group consisting of a touch switch, a capacitor switch, a knob, and a manual switch.

17. The device of claim 1, wherein the sensor is adapted to detect daytime conditions and nighttime conditions, and wherein based on the signal from the sensor, the actuator adjusts the optical power of the first zone to be 0.12 D to 0.75 D less plus or more minus in nighttime conditions than in daytime conditions.

18. The device of claim 1, wherein the sensor is adapted to detect daytime conditions and nighttime conditions, and wherein based on the signal from the sensor, the actuator adjusts the optical power of the first zone to be 0.12 D to 0.75 D more plus or less minus in nighttime conditions than in daytime conditions.

19. The device of claim 1, wherein the dynamic lens is an electro-active lens, and wherein in daytime conditions, the actuator deactivates the first zone.

20. The device of claim 1, wherein the second zone is an electro-active progressive power region.

* * * * *